Aug. 9, 1927.

H. W. FLETCHER 1,638,253

SOFT FORMATION WELL DRILL

Filed April 10, 1924

Harold W. Fletcher Inventor

By Jesse R. Stone

Attorney

Patented Aug. 9, 1927.

1,638,253

UNITED STATES PATENT OFFICE.

HAROLD W. FLETCHER, OF HOUSTON, TEXAS, ASSIGNOR TO HUGHES TOOL COMPANY, OF HOUSTON, TEXAS, A CORPORATION OF TEXAS.

SOFT-FORMATION WELL DRILL.

Application filed April 10, 1924. Serial No. 705,432.

My invention relates to a rotary drill for operating in soft formation in the boring of wells for oil, water, sulphur, and the like.

It is customary to employ scraping cutter drills in rotary drilling in soft formation, and the drill commonly used is called the fish tail bit, because it has a flat blade, and is formed on its cutting edge in the points diverging laterally like the tail of a fish. This drill will easily ball up during operation in sticky formations due to the packing of clay and gumbo about the blade and above the head of the drill. This is due partly to the fact that flushing water is discharged at the upper end of the drill at a point too far removed from the cutting edge. Also the blade only partially fills the hole, and large lumps of mud wash up around the head and clog the hole about the drill collar above the drill. Fish tail drills are made of steel of such composition that they may be heated and resharpened by the blacksmith when they become dull, and when thus made, they are quickly dulled when used in formation which heats the blade through the friction of rotation.

It is an object of my invention to provide a rotary soft formation drill which is practically self cleaning, and will not easily ball up and fail to cut.

It is another object to provide a soft formation drill having short blades which may be made cheaply and which will not easily heat in use or become dulled when so heated.

It is desired that the drill be so constructed as to be exceptionally strong and rugged, but cheap to manufacture so that when dull it may be discarded, and a new drill substituted. It is intended to cut for longer periods than the ordinary drill thus avoiding frequent withdrawals from the well, and saving time and expense for the driller.

It is also an object to provide a drill of the character stated which may be made in two pieces, easily and quickly assembled, the cutting portion of which may be removed without affecting the body of the drill which may be used indefinitely.

Figure 1:
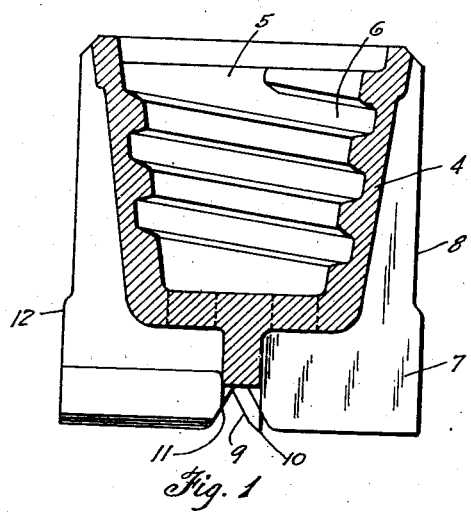
Figure 2:
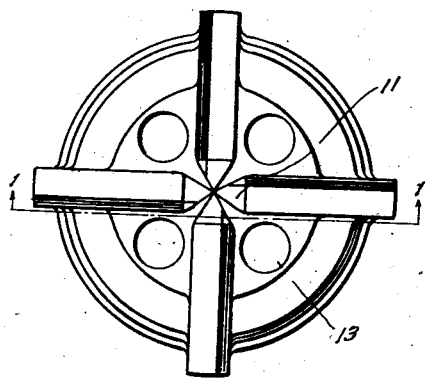
Figure 3:
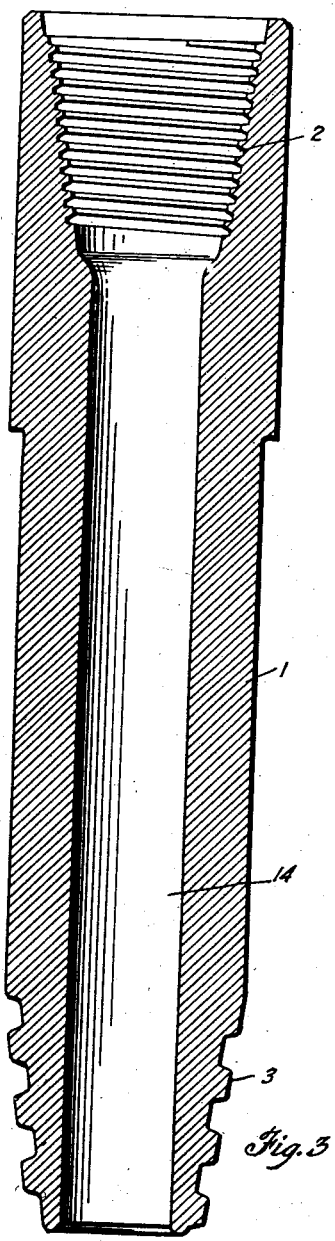

In the drawing herewith Fig. 1 is a vertical section of the bit taken approximately on the plane 1—1 of Fig. 2. Fig. 2 is a bottom plan view of the cutters; and Fig. 3 is a central vertical section through the body of the drill head. Like numerals of reference are applied to like parts in all the views.

The body portion of the drill which I contemplate employing may be made in various forms, and I have shown an elongated tubular member 1, the upper end of which is upset slightly, and formed with a tapered recess or socket 2 to receive a coupling by means of which it may be secured upon a drill stem. The lower end is tapered slightly and threaded with a heavy coarse thread 3, to fit within the head of the cutting element. It is desired that this body member be heavy and formed of hard steel capable of substantially reinforcing the cutter.

The head 4 of the said cutting element is shaped like the inverted frustum of a cone. It forms on its inner surface a socket 5 to receive the tapered end of said drill body. It has a female thread 6 to fit with the thread 3 on said tapered end. It will be noted that the body of the cutter 4 is but a thin shell depending upon the body member for additional strength.

The shell 4 also forms a supporting base for a plurality of radially extending blades 7 of which I have shown four in this embodiment. Said blades have their outer sides 8 approximately vertical, the lower ends being slightly wider at 12 to obtain clearance for the body of the drill. The lower cutting edges are beveled forwardly in the direction of rotation of the drill as shown at 9 in Fig. 1, thus presenting a sharp cutting edge 10 to the formation being drilled. The inner sides of the blades are beveled upwardly, thus forming a small centering point in the bottom of the hole as the drill operates.

It is desired that a large volume of flushing fluid be discharged directly upon the cutting edges of the blades, and to accomplish this, large openings 13 are formed in the lower end of the socket 5 between the adjacent blades. Flushing fluid passing through the channel 14 in the body member issues in large volume from tne openings 13 directly on the bottom of the hole in front of the cutting blades.

The shape of the head is rounded on the outer face, and tapered upwardly between the blades so that any mud tending to adhere to the face of the head is worked upwardly past the head. The head so fills the hole that large lumps of mud cannot wash up and pack about the drill body, but will be disintegrated at the bottom of the hole. The discharge of large quantities of water will greatly assist in disintegrating the soft material being drilled, and will carry it away before it can pack around the head.

I contemplate making this drill of a hard steel not easily dulled when hot. The head, the threaded socket, and radial blades may all be cast in one piece, and finished for use, without machining, at small cost, so that the cutting element can, if desired, be discarded when worn. If sharpening is desired, it may be done on an emery wheel without heating. Where so formed of hardened steel, the cutters will cut longer before dulling, and time will be saved in withdrawing the tool for renewal. Although the cutter element is comparatively thin, it will be so reinforced and strengthened by the body member that it will be enabled to withstand the rough usage to which it is subjected.

Having thus described my invention, the further objects and advantages of which will be apparent to one skilled in the art, what I claim as new is:

A cutter head for well drills comprising a comparatively thin shell of steel shaped like an inverted frustum of a cone, a coarsely threaded socket in said head, and radial scraping blades projecting in advance of said head, said head having openings in the flattened lower end thereof to direct the flushing fluid downwardly against the bottom of the hole.

HAROLD W. FLETCHER.